May 12, 1964 — B. B. STRANGE — 3,133,262
DUAL SEISMIC SURVEYING SYSTEM
Filed March 21, 1962 — 3 Sheets-Sheet 1
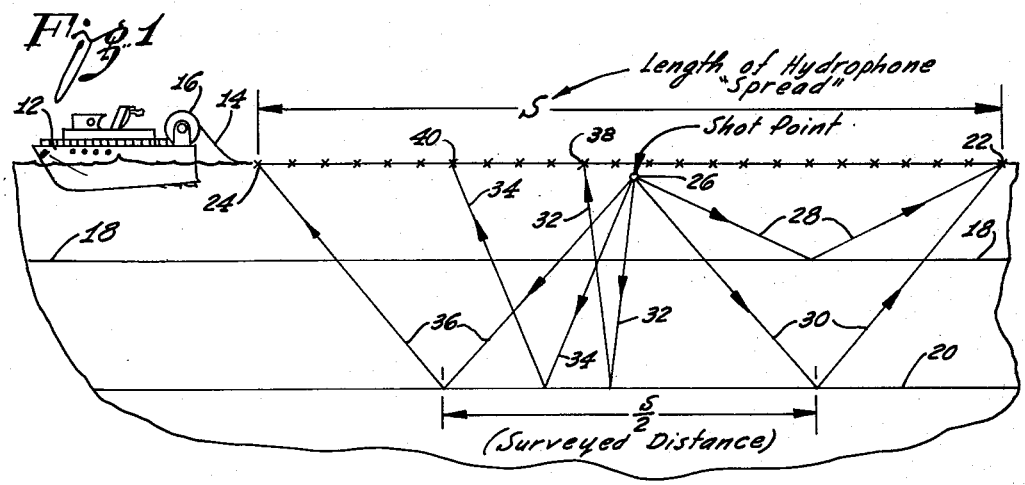
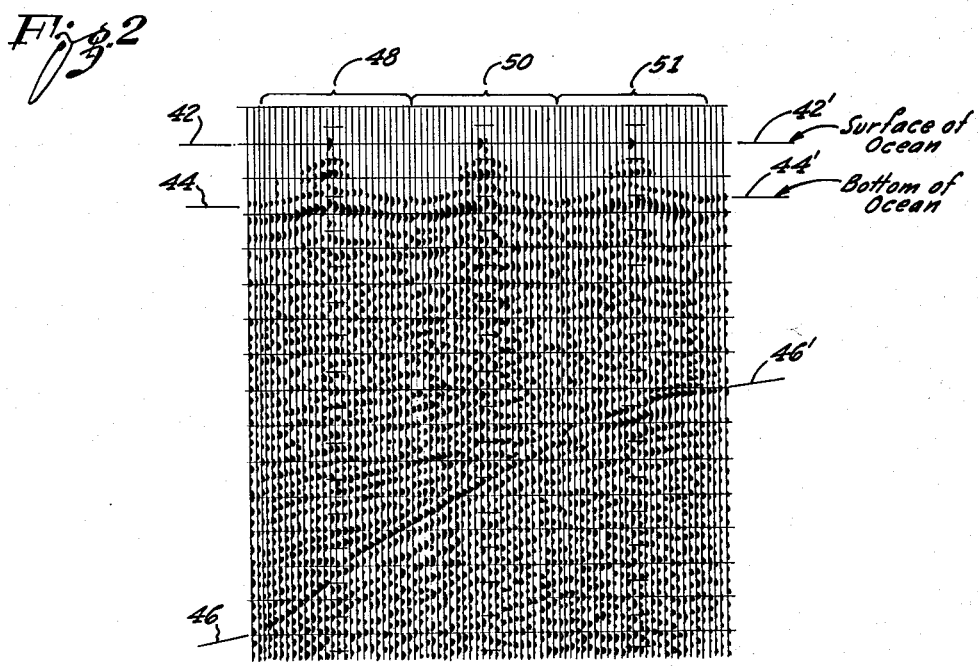
INVENTOR:
Booth B. Strange
By Alan C. Rose
Attorney May 12, 1964  B. B. STRANGE  3,133,262
DUAL SEISMIC SURVEYING SYSTEM
Filed March 21, 1962  3 Sheets-Sheet 2
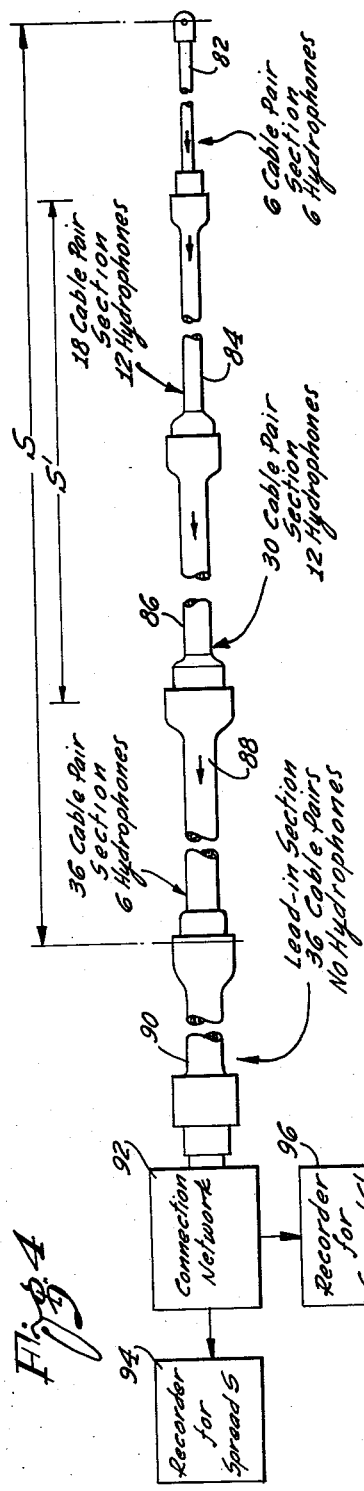
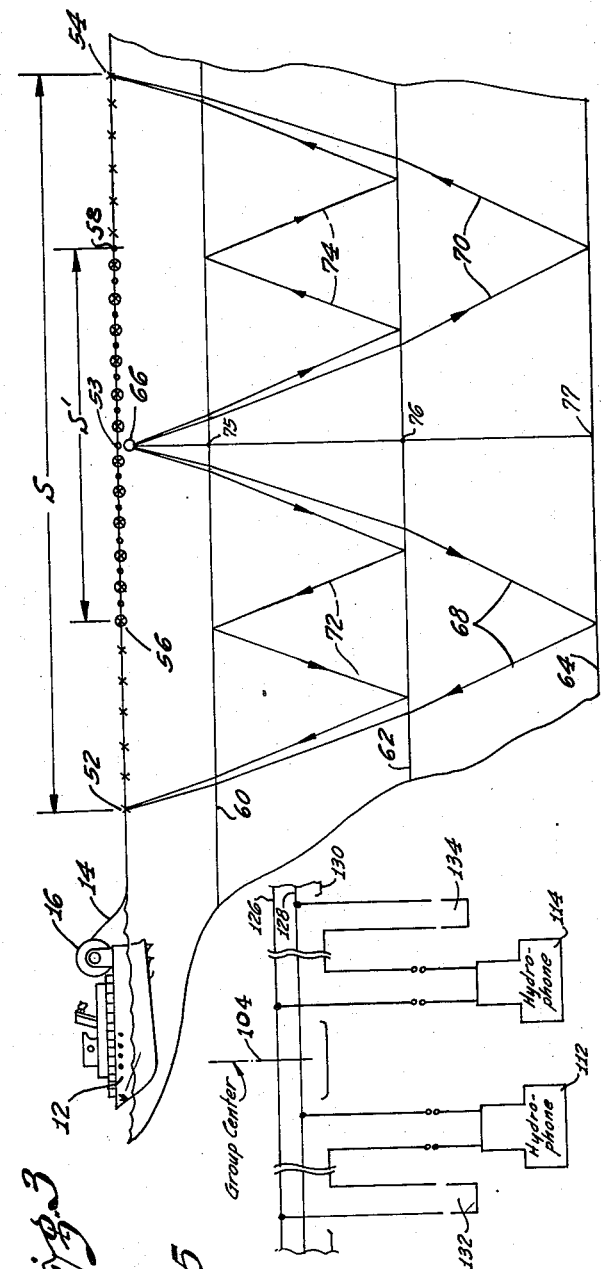
INVENTOR:
Booth B. Strange
By Alan C. Rose
Attorney

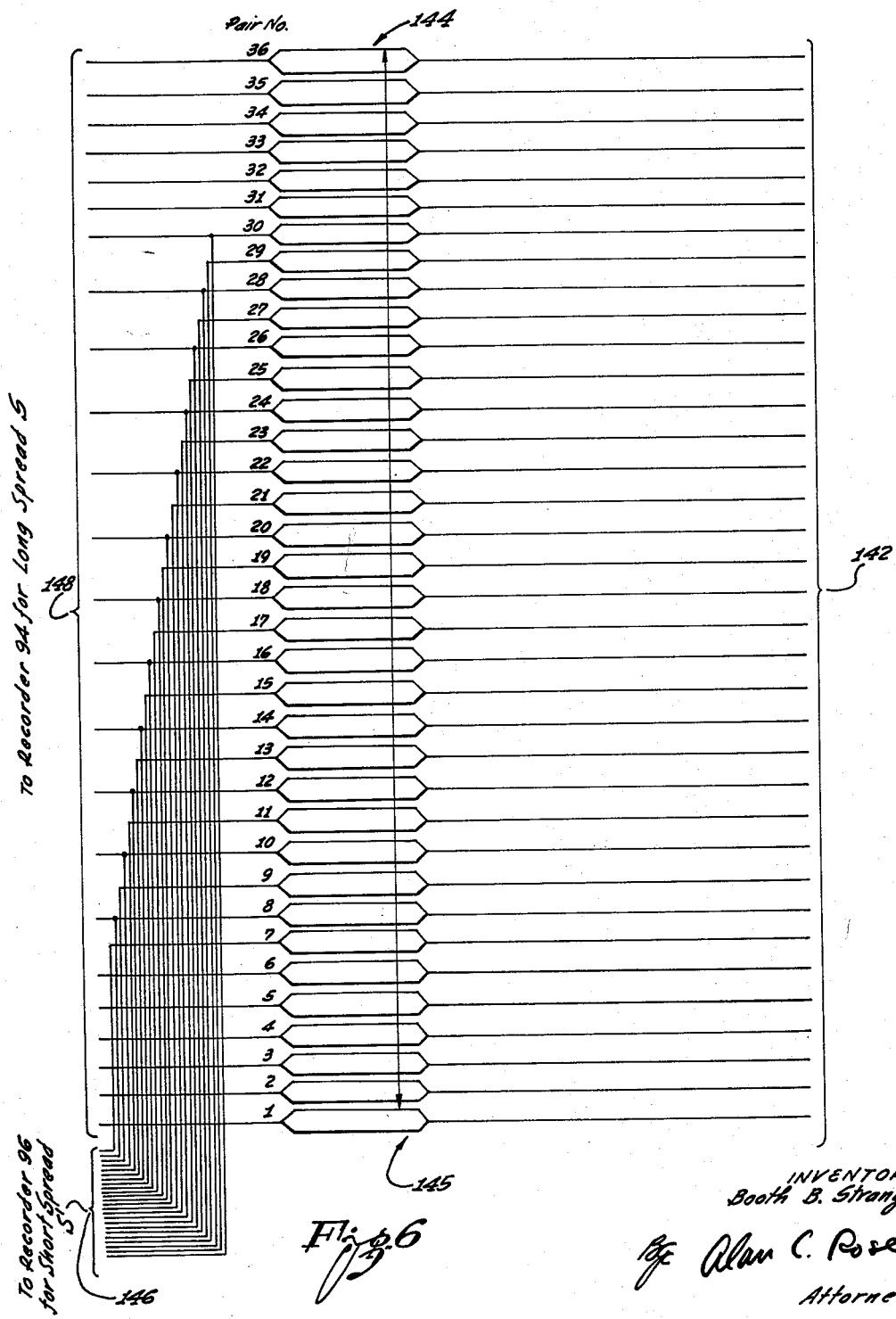

United States Patent Office 3,133,262
Patented May 12, 1964

3,133,262
DUAL SEISMIC SURVEYING SYSTEM
Booth B. Strange, Shreveport, La., assignor to Western Geophysical Company of America, Los Angeles, Calif.
Filed Mar. 21, 1962, Ser. No. 181,270
12 Claims. (Cl. 340—7)

This invention relates to seismic survey equipment and more particularly to marine seismic survey equipment, including hydrophone cable and associated apparatus for determining the form of the ocean bottom and geophysical formations below the bottom of the ocean.

In seismic survey work, it is customary to employ a cable carrying a number of detectors which are sensitive to seismic signals. Those pick-up devices which are employed in marine work are known as hydrophones. In land work, the detectors are known as geophones or seismometers. In the usual apparatus, a set of hydrophones is evenly spaced along the length of a floating cable which is pulled along behind a ship. A linear arrangement of detectors of this type is known in the art as a "spread." A group of detectors is sometimes employed instead of a single detector, and the phase "hydrophone group" or "geophone group" or the simple term "phone" may be employed to designate either a single detector or a group of closely spaced detectors. In operation, using the "reflection" method, an explosive charge is detonated in a hole in the earth, or in the water near the surface of the ocean at a point offset from the middle of the spread of detectors.

The ship in marine work normally stops briefly while the detonation and recording is accomplished. Shock waves from the explosion travel through the water to the bottom of the body of water and are reflected back to the hydrophones, and the resultant signals are recorded. When this conventional technique is employed, a profile, including a number of points corresponding to the number of hydrophone groups, is obtained. The length of the profile is normally equal to one-half of the overall spacing of the hydrophone spread, in view of the geometric pattern of the reflected waves which are picked up by the hydrophones.

Geological formations below the bottom of the ocean may also be investigated through reflections at surfaces where the density or other properties of the strata undergo abrupt changes. Thus, for example, a salt dome which might otherwise be obscured by layers of silt forming a level ocean bottom, is readily revealed by conventional oceanographic survey techniques.

One problem which plagues oceanographic surveyors is the false indications occasionally produced by multiple reflections. Such false reflections typically occur when there is a sharp discontinuity both at the bottom of the ocean and at a dominant stratum below the bottom of the ocean. Under these adverse conditions, seismic waves pass through the bottom of the ocean, are reflected from the dominant stratum back to the bottom or surface of the ocean; then the seismic waves are refleced downward again to the dominant stratum, and they are finally reflected upward through the ocean floor to the hydrophone array. Double reflections of this type give a false indication of an additional discontinuity located below the dominant stratum by a distance equal to the spacing between the ocean floor and the dominant stratum. Double or higher-order multiple reflections also frequently override and obscure primary reflections from deeper strata.

In the case of a conventional 24 hydrophone spread, with the shot, or explosive charge, detonated near the center of the array, the elapsed time for seismic waves to reach the remote hydrophones is significantly greater than the time required for reflections to reach the centrally-located hydrophones. This difference in the time of arrival of reflections from a horizontal plane is known as "normal moveout." Standard techniques are available for removing the effects of normal moveout from the signals received at the various hydrophones. These techniques involve the compression or displacement of recorded information from remote hydrophones so that it is consistent with recorded information from the centrally-located hydrophones of the spread. Following processing to remove the effects of normal moveout, parallel visible reproductions of the recorded signals provide an accurate indication of subsurface formations. In the absence of normal moveout correction, the data from each set of hydrophones form curved patterns corresponding to the difference in the lengths of the paths which the seismic waves follow.

Returning to the problem of multiple waves, normal moveout correction techniques may be employed to reveal multiple reflections if the spread of the hydrophones is sufficiently large with respect to the depth of the subsurface formations which are being studied. This is possible because of the difference in the velocity of seismic waves at different depths. Specifically, the velocity of seismic waves increases significantly with increasing depth. A multiple reflection echo from a discontinuity near the surface therefore has travelled at a lower velocity than a normal seismic wave which is reflected only once from a deeper stratum. The moveout is inversely related to the velocity; accordingly, the moveout of a multiple reflection signal is significantly greater than the moveout for a reflected signal from a corresponding true deeper substratum. Standard arrangements designed to correct moveout at the apparent location of a deeper substratum would not fully correct moveout for multiple reflections, and would therefore provide curved pattern for the false echos, if the spacing of the hydrophones is sufficiently great. When the spacing of the hydrophones is fairly small with respect to the depth of the stratum under investigation, however, there is very little moveout and even less difference in moveout between true single reflections and "false" multiple reflections. The difference in the latter case becomes less than the ordinary random errors of measurement. The erroneous nature of the multiple reflection pattern, therefore, cannot easily be detected.

Accordingly, for the purpose of distinguishing and rejecting false patterns caused by multiple reflections, it is desirable that the hydrophones be spaced over a long spread and hence, since the number of groups is fixed, far apart. In order to provide a moderately high density of points along the profile, however, it is desirable that the hydrophones be spaced fairly close together. Up to the present time, these conflicting requirements have usually been resolved by using an intermediate spacing in which the hydrophones are neither as close together as would be desired for detailed examination of the configuration of the profile, nor as broadly spaced as would be desirable from a standpoint of detecting and rejecting false signals. In some cases separate successive studies of the same oceanographic area have been made first with a short spread and later with hydrophones arranged in a longer spread. This, of course, involves double work and duplication of equipment. Furthermore, the successive studies normally would not follow exactly the same oceanographic path, and therefore may not be entirely compatible.

Accordingly, a principal object of the present invention is the simplification and reduction in cost of surveys which can both provide the desired detailed profile data and also resolve uncertainties introduced by multiple reflections.

Another more specific object of the invention is the combination of closely-spaced and widely-spaced spreads of detectors in a practical and economical manner.

In accordance with the present invention, the foregoing objects may be realized by the use of a compound hydrophone spread in which both a closely-spaced spread of detectors and a widely-spaced spread of detector are included. By choosing the spacings of the longer spread to be a multiple of that of the shorter spread, many of the detectors in the complete linear system may be used in common. On board the ship towing a cable carrying the compound spread of hydrophones, two recorders may be provided to record signals from the long hydrophone spread and from the short hydrophone spread, respectively. When this arrangement is employed, the output signals for some of the hydrophones are connected to both recorders.

In one specific implementation of the foregoing arrangement, a central section of 24 closely-spaced hydrophones or hydrophone groups were provided for the closely-spaced spread. In addition, two end sections of cable each including six widely-spaced hydrophone pick-up stations are connected to either side of the central cable section. These 12 additional hydrophones, together with every second one of the hydrophones in the central section of the cable provided the broad-spaced spread of 24 hydrophones. With this arrangement the central section of cable may be employed alone where physical conditions do not permit the use of the long cable or where, for other oceanographic mapping reasons, a long array is not needed. However, for general survey purposes where it is highly advantageous to have data from both the long and the short spreads, the full cable is employed, with 12 of the hydrophone stations being used in common between the long and the short spaced arrays. Under these conditions, two 24 track recorders are employed, one for recording information from the closely-spaced spread, and one for recording information from the other spread in which the hydrophone pick-up stations are spaced relatively far apart.

As noted above, the distance along the reflecting surfaces covered by each shot is approximately one-half the length of the spread of hydrophones. In the present case where the short spread is one-half the length of the active portion of the complete cable, shots are made with an explosion near the center of the cable whenever the ship moves a distance equal to one-quarter the total length of the cable. While both recorders may be activated during each shot, it is only necessary to energize the recorder associated with the longer spread during every other shot. This follows, of course, from the double length of the longer spread in the specific illustrative example set forth above.

In accordance with a feature of the invention, therefore, an oceanographic seismic survey cable may be provided with a first spread of hydrophone pick-up stations spaced apart by relatively short distances along the length of the cable, and a second spread of hydrophone pick-up stations spaced apart by distances which are commensurate with or a multiple of the short spread, so that some of the hydrophone stations may be used in common.

Separate recorders may be provided for the two spreads, with each recorder being connected to receive signals from some hydrophones in common with the other recorder and to receive other signals from hydrophone stations to the exclusion of the other recorder.

In accordance with a featured method of the present invention, oceanographic surveying may be accomplished by simultaneously recording from a closely-spaced spread and a widely-spaced spread of hydrophones.

In accordance with another feature of the invention, the recording as set forth in the preceding paragraph may be accomplished by including at least some hydrophone stations in both the closely-spaced spread and the widely-spaced spread, and recording information from these hydrophone stations in combination both with other hydrophones in the closely-spaced spread and also in combination with recorded signals from the widely-spaced array.

Advantages of the proposed seismic surveying technique include reduction in equipment, in that some of the hydrophones required for two complete spreads may be eliminated, and also include obvious savings in explosives and time. In addition, by making surveys with a long spread and with a short spread simultaneously, the two surveys will assuredly cover precisely the same geographical area; evaluation of the resultant data is therefore greatly simplified.

The novel features which are believed to be characteristic of the invention, both as to its organization and method of construction and operation, together with further objects, features and advantages thereof, will be better understood from the following description considered in conjunction with the accompanying drawing in which illustrative embodiments of the invention are disclosed, by way of example. It is to be expressly understood, however, that the drawing is for the purpose of illustration and description only and does not constitute a limitation of the invention.

In the drawing:

FIG. 1 is a diagrammatic showing of the operation of oceanographic surveying equipment;

FIG. 2 is a typical showing of traces recorded from oceanographic survey work;

FIG. 3 shows a compound hydrophone spread in accordance with the invention, and certain multiple reflections which may cause false indications in oceanographic survey work;

FIG. 4 represents a typical cable construction which may be used to implement the principles of the present invention, and certain associated connection and recording apparatus;

FIG. 5 is a circuit diagram showing the electrical connections of a pair of hydrophones forming a group of detectors adjacent one of the group centers; and FIG. 6 shows the pattern of connections from the end of the cable to the associated recorders for the two different spreads.

With reference to the drawings, FIG. 1 shows an oceanographic survey ship 12 towing a cable 14 behind it. The large reel 16 is provided on the rear deck of the vessel 12 to hold the cable 14 when surveying work is not in progress. The line 18 represents the bottom of the body of water which is being surveyed and the line 20 represents the boundary between strata of material below the bottom of the ocean. The cable 14 extends to point 22. Twenty-four hydrophones are evenly-spaced along the cable 14 at the points marked by x's between the points 22 and 24. The hydrophones are connected by individual cable pairs to recorders on the survey vessel 12.

In operation, a charge of explosives or a "shot" is detonated just below the surface of the water at a point a few hundred feet offset from the center of the spread of hydrophones on a perpendicular bisector of the hydrophone spread. The shot point is indicated at 26 in FIG. 1.

The seismic or shock wave from the detonation is shown in FIG. 1 by a series of rays 28, 30, 32, 34 and 36. The rays 28 and 30 are indicated as being picked up by the hydrophone located at point 22. It may be noted that the ray 28 is reflected from the bottom 18 of the ocean while the ray 30 is reflected from the discontinuity 20. The path of the shock wave along ray 28 is much shorter than that of the ray 30 which is reflected from the substratum. The hydrophone at point 22 will therefore pick up an initial shock wave when ray 28 arrives, and will pick up a subsequent shock wave when the signal from the substratum arrives along path 30. These successive shock waves produce electrical signals which are transmitted from the hydrophone at point 22 through cable 14 to a recorder in vessel 12.

Similar signals are picked up at each of the 24 hydrophones and the signals are recorded concurrently, usually on parallel tracks. These electrical signals may be converted to optical form to give a visual representation of the subsurface geophysical structures, as shown in FIG. 2.

Rays 32, 34, 36 are all reflected from the discontinuity 20. Ray 32 follows a relatively short path from shot point 26 to a nearby hydrophone 38; ray 34 follows a somewhat longer path to hydrophone 40; and the shock wave following the path indicated by lines 36 traverses a significantly greater distance in reaching the hydrophone located at point 24. The difference in time for the shock waves to reach hydrophones located away from the middle of the spread is termed "normal moveout." Compensation for normal moveout may be achieved by the displacement in time of the signal received at the more distant hydrophones. Corrections accomplished by relative displacement of the signals recorded at the hydrophones are only effective for signals reflected from a predetermined depth, however.

With reference to FIG. 1, it may be seen that the total distance which is surveyed is equal to S/2, or one-half of the length of the hydrophone spread. This may be observed from the points where rays 30 and 36 are reflected from the stratum 20. The distance between these two points is designated S/2 at the bottom of FIG. 1.

FIG. 2 is a representation of the subsurface features as produced by a series of shots. In FIG. 2 the surface of the ocean is indicated by the lines 42, 42'; the bottom of the ocean is indicated by lines 44, 44'; and a discontinuity which actually turned out to be the upper surface of a salt dome, is indicated by the lines 46, 46'. The top of the salt dome was, of course, off to the right of the profile shown in FIG. 2.

The representation of FIG. 2 is formed by a series of three shots centered at points 48, 50 and 51. The bracket adjacent point 48 indicates the twenty-four recording traces provided by the twenty-four hydrophones energized when the first shot took place. Successive additional groups 24 traces are indicated by the additional brackets associated with points 50 and 51. The direct shock wave which passes horizontally through the water is indicated immediately under points 48, 50 and 51 near the top of FIG. 2. In each case the traces are formed photographically by the blackening of the areas encompassed by the displacement of a line of light from its neutral position; accordingly, the darkened areas represent the zones where strong reflections have been received at the hydrophones. Moveout correction has been accomplished only for depths substantially below the bottom of the ocean; thus, the curved pattern of normal moveout is clearly visible along lines 44, 44' representing the bottom of the ocean.

Now that conventional oceanographic survey techniques have been reviewed, reference is made to FIG. 3 showing a compound hydrophone array in accordance with the present invention. In the array of FIG. 3, a long spread of hydrophones is indicated by the x's located between points 52 and 54. The long spread extends for a distance designated S in FIG. 3. A short hydrophone array, extending over a distance designated S' in FIG. 3, includes the hydrophones designated x between points 56 and 58. It also includes the hydrophone groups "o" which appear between some of the hydrophone stations designated "x," which also form part of the longer hydrophone array. In summarizing, therefore, the hydrophone stations in the longer array S are designated by x's, the hydrophones in the shorter array S' are designated by o's, and the hydrophones which are employed in common between the two arrays are designated by an "o" superimposed on an x.

Other features shown in the diagram of FIG. 3 include the bottom of the ocean designated 60 and two interfaces between geologic strata 62 and 64. When a shot is detonated at point 66 near the common center of both spreads, reflections are received from the deeper interface 64 at the remote hydrophones 52 and 54, as indicated by lines 68 and 70, respectively. Reflections are received also, at near hydrophone 53, from point 77 on interface 64.

Multiple reflections along the paths 72 and 74 could provide signals at the hydrophones giving a false indication of the presence of a substratum approximately at the depth indicated by line 64. However, as discussed in the introduction, the velocity of seismic waves increases significantly with increasing depth. Accordingly, with reference to FIG. 3, the waves following the path 72 from shot point 66 to the hydrophone at point 52 would travel more slowly than waves traversing the path shown by lines 68, even though the waves traveling path 66—76—75—76—53 and path 66—77—53 have exactly the same elapsed times. The moveout, representing the difference in time for the travel of waves to remote hydrophones 52, 54 as compared with the elapsed time for waves to be reflected to hydrophone nearest the shot point 53, will therefore be greater for the multiple reflection path 72 than for the direct reflection path 68. When normal moveout correction is made for the indicated depth of stratum 64, therefore, false indications involving multiple reflections are revealed by the absence of full correction for moveout. They would therefore appear as a series of arcs of the type shown along lines 44, 44' in FIG. 2.

When the depth of the formation being surveyed is much greater than the spread distance S, very little moveout occurs. Accordingly, with reference to FIG. 3, the moveout obtained from the spread S' would be much less than that obtained through the use of the spread S. When there is very little moveout in the original received set of signals it is most difficult to distinguish erroneous signals caused by multiple reflections from true reflections from subsurface strata. Accordingly, it is frequently desirable to use a long spread such as that indicated by the spread S extending between points 52 and 54 in FIG. 3.

It is also useful to explore the profile with some particularity. Obviously with a longer spread, a much lesser number of points per unit distance may be obtained. The present compound hydrophone spread, with the shorter spread S' in addition to the longer spread S meets both of these two requirements. Thus, it has the long length required for detecting spurious multiple reflections, and also has the closely-spaced spread of hydrophones required for detailed under-water surveys.

The compound hydrophone array shown in FIG. 3 is arranged so that the longer set of hydrophones has its center at the same point as the shorter spread of hydrophones. A single shot near the center of the two spreads is therefore employed to energize both spreads. It is to be understood that variations in the arrangement could, of course, be employed. Thus, every third or every fourth hydrophone in the central array could be used in combination with the longer array. In addition, the short array S' could be used in combination with a longer set of widely-spaced hydrophones all at one end. This last proposed array is designed to be used with shots at the end of the cable rather than at the center. Such arrangement would still enjoy the advantages of the present preferred embodiment, in that every other hydrophone in the closely-spaced spread could still be employed in the extended spread.

FIG. 4 indicates one possible physical realization of the cable structure in accordance with the present invention. The outermost cable section 82 carries six hydrophone groups, as indicated by the extension of the spread S beyond the spread S' in FIG. 3. Cable section 82 therefore includes six pairs of wires to carry signals from the hydrophones to the other cable sections 84, 86, 88 and 90, and ultimately to the connection network 9. The additional cable sections 84, 86 and 88 have 18, 30, and 36 cable pairs, respectively, to accommodate the additional hydrophones, as well as signals from hydrophone groups in cable sections remote from the connection network 92. The cable pairs are brought out to the connection network 92, and signals from the appropriate leads are connected to recorders 94 and 96. Recorder 94 receives signals from the longer spread S, while recorder 96 receives signals from the shorter spread S'. As discussed previously, some hydrophones located at common group centers provide signals for both recorders 94 and 96, while other hydrophones provide signals only for the recorder 94 associated with the longer spread S or for recorder 96 associated with the shorter spread S'.

The cable of FIG. 4 is intended for towing behind a ship and may have each hydrophone connected to it in accordance with known practices. Two known prior art arrangements are disclosed, for example, in L. C. Paslay Patent No. 2,465,696, granted March 29, 1959, and J. H. Woodworth Patent No. 2,923,916, granted February 2, 1960. The hydrophones are preferably located at a uniform depth below the surface of the water. The hydrophones may also be of a known design, and may suitably be of the form disclosed in U.S. Patent No. 2,902,668, entitled "Pressure Sensitive Device" which was granted to Carl H. Savit on September 1, 1959.

FIG. 5 shows the electrical circuit for a section of cable associated with a typical hydrophone group. The circuit includes hydrophones 112 and 114 which are located equal distances on opposite sides of the group centerline 104. Three wires 126, 128 and 130 are associated with each group center. The hydrophones 112 and 114 are connected in parallel between leads 126 and 128. Lead 126 is common and lead 128 is normally the active color-coded lead on which the seismic signals from phones 112 and 114 are sent. Lead 130 is a spare lead. Access for testing and changing to spare leads is provided by connections 132 and 134. Additional hydrophones may also be provided at these points.

FIG. 6 shows the electrical connections which are included in the network 92 of FIG. 4. As noted above, the cable 90 includes 36 cable pairs corresponding to the number of hydrophones in the two spreads S and S'. The wires 142 at the right-hand side of FIG. 6 are connected to cable 90. Each of the wires 142 actually represents a cable pair rather than a single line. The leads 142 are numbered from 1 to 36 to indicate the pair number and the hydrophone group to which the pair is connected. Pair No. 1 is connected to the hydrophone group along the cable 88 which is closest to the ship, and pair 36 is connected to the farthest hydrophone. The leads 142 are shown separated into pairs at reference numeral 144 in FIG. 6 to indicate that the leads 142 actually are pairs. At the left-hand side of FIG. 6, the lower set of wires 146 is routed to recorder 96 relating to the short spread S' as shown in the block circuit diagram of FIG. 4. Similarly, the wires 148 at the upper left side of FIG. 6 are coupled to recorder 94 which records data from the long spread S. In examining the connections in some detail, it may be seen that the recorder 94 is connected to cable pairs 1 through 6, the even-numbered pairs 8 through 30, and also to pairs 31 through 36. These 24 signals provide the recording traces indicated by the numbers 1 through 24 which are applied to leads 148. Similarly, leads 146 for recorder 96 are connected to all of the cable pairs 7 through 30. The successive leads 7 through 30 provide the twenty-four traces 1 through 24 which appear upon leads 146 to produce the short spread signals.

The significance of the twenty-four sets of leads designated by the reference numeral 146 and the additional twenty-four sets of leads 148 will be more readily understood by reference to FIG. 2. As mentioned above, each of the groups of traces 48, 50 and 52 in FIG. 2 include twenty-four traces which were derived from a single shot. These twenty-four traces were produced by signals picked up at twenty-four spaced groups of hydrophones in the manner described above. It should be noted in passing that FIG. 2 represents a display derived from a single one of the recorders of FIG. 4.

In marine seismic survey work, the spacing between successive hydrophone group centers is often either 50 meters or 100 meters. The principles of the present invention are applicable to the implementation of a seismic survey apparatus in which the hydrophone spacing in the short spread is 50 meters, or approximately 164 feet, and the spacing between hydrophone group centers in the longer spread is 100 meters, or about 328 feet.

It is to be understood that the above-described arrangements are illustrative of the application of the principles of the invention. Numerous other arrangements may be derived by those skilled in the art without departing from the spirit and scope of the invention. Thus, by way of example and not of limitation, the longer spread can be three or four times the length of the shorter spread instead of merely double the length of the shorter spread; similarly, three or more spreads can be included in a single cable, instead of just two spreads. In preferred embodiments of the invention, the different spreads use some common hydrophones, and the spacing for the detectors in the different spreads are therefore commensurable. For purposes of "in-line" shooting, the closely-spaced hydrophones are located toward one end of the cable and the more widely-spaced hydrophones are located toward the other end; and other minor modifications of the structural and electrical interconnections of the proposed system can also be clearly accomplished. Thus, in actual practice, the cable of FIG. 4 can be divided into shorter sections for ease in fabrication, handling and repair. It is also to be noted that, while the present invention is principally applicable to marine seismic work, the concepts are also applicable to multiple geophone spreads or arrays in land geophysical work. Accordingly, from the foregoing remarks, it is to be understood that the present invention is to be limited only by the spirit and scope of the appended claims.

In the claims:
1. A compound seismic survey cable apparatus comprising:
   a terminal cable section,
   at least one central cable section, means for connecting said central cable section to said terminal cable section;
   a remote cable section, means for connecting said remote cable section to one of said central cable sections;
   first hydrophone groups connected to said central cable section, said hydrophone groups being spaced apart by a predetermined distance, and
   additional hydrophone groups connected to said terminal and said remote cable sections, the spacing of said additional hydrophone groups being greater than said predetermined distance.
2. A seismic survey cable apparatus comprising:
   a first section, and a first set of at least six hydrophone groups secured in evenly-spaced relationship along the length of said first section of cable, said first section including at least 36 signal-carrying circuits for transmitting signals from hydrophone groups to one end of said first section;

a second cable section, means for connecting the second section to the other end of said first cable section, said second section including at least 30 signal-carrying circuits for transmitting seismic signals to said first cable section, and a second set of at least 12 hydrophone groups spaced apart at a distance approximately equal to ½ the spacing of said first set of six hydrophone groups, said second set being connected to 12 of said 30 circuits; and a third cable section having at least six signal-carrying circuits, means for connecting the third cable section to the free end of said second cable section, and a third set of at least six hydrophone groups spaced apart by approximately the same distances as those in said first cable section, and connected to said six circuits.

3. A compound oceanographic survey apparatus, comprising a central section of 24 hydrophone groups connected to a cable, six additional hydrophone groups connected to a remote section of the cable, an additional six hydrophone groups connected to a proximate section of the cable, the spacing of the additional hydrophone groups being substantially greater than the spacing of the 24 hydrophone groups of said central section, and means for connecting all of the hydrophone groups to the proximate end of the cable.

4. A compound oceanographic survey cable apparatus comprising:
   a terminal cable section for connection to the survey vessel;
   at least one central cable section having one end connected to said terminal cable section and a remote cable section connected to the other end of said central cable section;
   a first spread of hydrophone groups connected to said central cable section, said hydrophone groups being spaced apart by a predetermined distance;
   additional hydrophone groups connected to said terminal and said remote cable sections, the spacing of said additional hydrophone groups being a multiple of more than one of said predetermined distance; and
   said terminal and central cable sections having more leads than said remote section to carry seismic signals from the distant hydrophone groups.

5. A compound oceanographic survey cable apparatus comprising:
   a terminal cable section for connection to the survey vessel;
   at least one central cable section having one end connected to said terminal cable section, and a remote cable section connected to the other end of said central cable section;
   a first spread of hydrophone groups connected to said central cable section, said hydrophone groups being spaced apart by a predetermined distance; and
   additional hydrophone groups connected to said terminal and said remote cable, the spacing of said additional hydrophone groups being significantly different from said predetermined distance.

6. A compound oceanographic survey cable apparatus comprising:
   a terminal cable section;
   at least one central cable section, means for connecting said central cable section to said terminal cable section;
   a remote cable section, means for connecting said remote cable section to one of said central cable sections;
   first hydrophone groups connected to said central cable section, said hydrophone groups being spaced apart by a predetermined distance; and
   additional hydrophone groups connected to said terminal and said remote cable sections, the spacing of said additional hydrophone groups being significantly different from said predetermined distance.

7. A marine seismic survey apparatus, comprising:
   a plurality of hydrophones;
   means for supporting a series of said hydrophones in a line in a body of water, said series including a first spread of spaced hydrophone groups in one region along said line and additional more widely-spaced hydrophone groups located in another region along said line;
   means for recording a set of seismic signals from said first spread of hydrophone groups; and
   additional means for simultaneously recording a set of seismic signals from said more widely-spaced hydrophone groups and selected hydrophone groups of said first spread.

8. A marine seismic survey cable apparatus comprising:
   a terminal cable section for connection to a survey vessel;
   at least one central cable section having one end connected to said terminal cable section and a remote cable section connected to the other end of said central cable section;
   a first spread of hydrophone groups connected to said central cable section, said hydrophone groups being spaced apart by a predetermined distance; and
   additional hydrophone groups connected to said terminal and said remote cable sections, the spacing of said additional hydrophone groups being a multiple of more than one of said predetermined distance.

9. A seismic survey apparatus comprising:
   a plurality of detectors;
   means for supporting a set of said detectors over a geographical area to be surveyed, said set including a first array of detector groups having a predetermined spacing in one region of said area, and additional detector groups spaced apart by distances which are greater than but commensurable with said predetermined spacing located in another region of said area;
   first recording means for recording a set of seismic signals from said first array of detector groups; and
   additional recording means for recording a simultaneously a set of seismic signals from said additional detector groups and selected detector groups of said first spread array.

10. A seismic survey apparatus comprising:
    a plurality of detectors;
    means for supporting a set of said detectors over a geographical area to be surveyed, said set including a first array of spaced detector groups in one region of said area and additional more widely-spaced detector groups located in another region of said area;
    first recording means for recording a set of seismic signals from said first array of detectors; and
    second recording means for simultaneously recording a set of seismic signals from said additional detector groups and selected detector groups of said first array.

11. An oceanographic survey apparatus for producing electrical signals representing seismic data for recording comprising: a plurality of hydrophone groups and support means for supporting said hydrophone groups in a substantially linear array to survey a geographical area,
    said support means comprising means for supporting a first spread of hydrophone groups in a first region of said linear array with the hydrophone groups of the first spread being spaced apart from each other by a predetermined distance,
    said support means additionally comprising means for supporting a second spread of hydrophone groups in a second region of said linear array with the hydrophone groups of the second spread being spaced farther apart from each other than said predetermined distance,
    and means associated with said support means for conveying a first set of electrical signals from said first spread of hydrophone groups in said first region,
    and means associated with said support means for conveying a second set of electrical signals from hydrophones in said first and second regions.

12. A seismic surveying apparatus comprising:

means for supporting a first spread of detector groups in a substantially linear array, the detector groups in said array being spaced apart by a predetermined distance;

means for supporting additional detector groups substantially aligned with and adjoining said first array and spaced apart by distances which are greater than said predetermined distance;

means for producing a seismic shock near said arrays;

means for recording a set of seismic signals from said first array and for recording an additional set of seismic signals from said additional detector groups and from selected detector groups in said first array, which form, with said additional detector groups an array more widely spaced than said first array.

References Cited in the file of this patent

UNITED STATES PATENTS 2,590,531   McLoad _____ Mar. 25, 1952